March 12, 1940.  J. L. RIGGS  2,193,009
COTTON STALK CUTTER
Filed Feb. 24, 1939  2 Sheets-Sheet 1
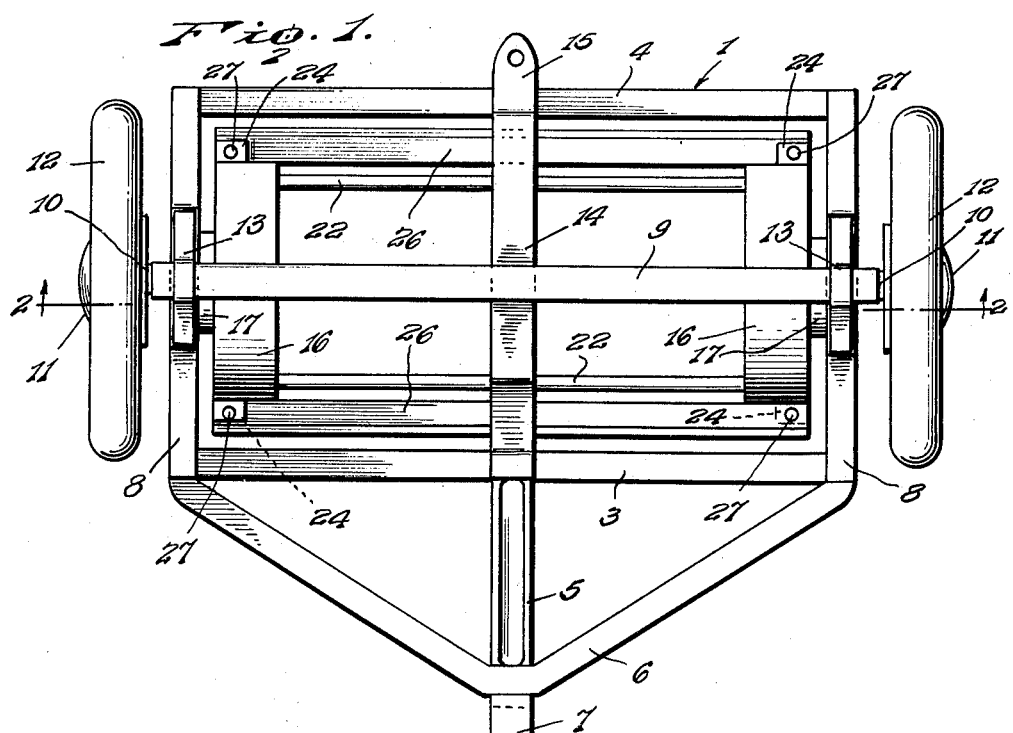
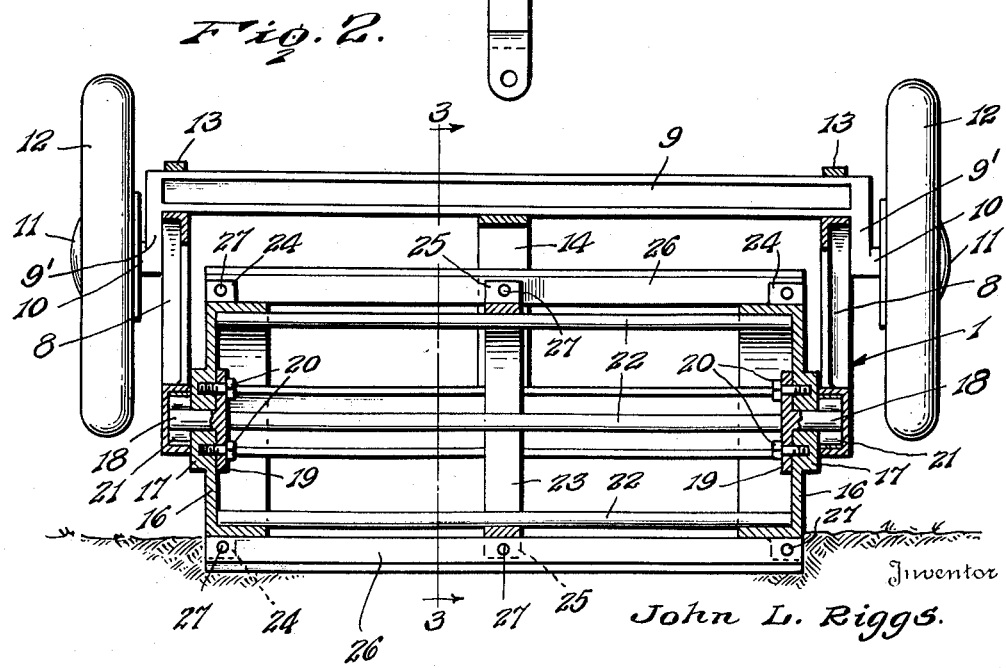
Inventor
John L. Riggs.

March 12, 1940.    J. L. RIGGS    2,193,009
COTTON STALK CUTTER
Filed Feb. 24, 1939    2 Sheets-Sheet 2
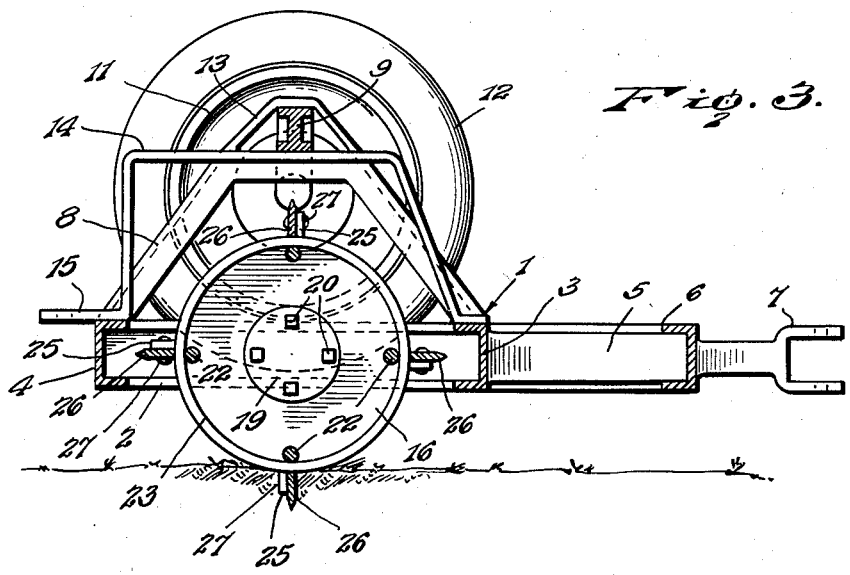
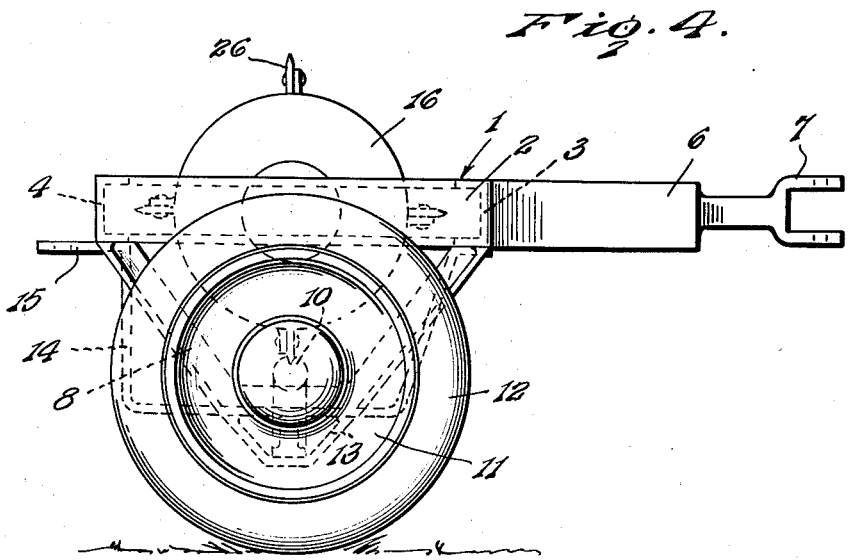
Inventor
John L. Riggs.
By Ross J. Woodward.
Attorney Patented Mar. 12, 1940

2,193,009

UNITED STATES PATENT OFFICE 2,193,009

COTTON STALK CUTTER

John L. Riggs, Mesa, Ariz., assignor of twenty-four and one-half per cent to Adolph C. Kirchoff and twenty-four and one-half per cent to Elijah Allen, both of Mesa, Ariz.

Application February 24, 1939, Serial No. 258,335

2 Claims. (Cl. 55—61)

This invention relates to agricultural machines and more particularly to a cotton stalk cutter, it being one object of the invention to provide a machine of this character having a frame and cutting blades and ground engaging wheels, the cutting blades and wheels being in such relation to each other that the wheels will be disposed in an elevated position out of engagement with the ground when the machine is in use and the blades disposed in an elevated position when the machine is inverted to dispose the wheels in engagement with the ground while transporting the machine from place to place.

Another object of the invention is to provide a cotton stalk cutter having its blades secured to drums which are rotatably mounted in roller bearings carried by the frame of the machine, the drums being connected by bracing bars or rods and thus providing a very strong rotatably mounted carrier for the blades, which project from the drums radially thereof for cutting action during turning of the carrier.

Another object of the invention is to so form the frame that the axle which extends transversely thereof will be out of the way of the cutting blades and their rotary carrier and the wheels mounted beyond sides of the frame in such position that by merely inverting the machine the wheels or the blades may be brought into engagement with the ground.

Another object of the invention is to provide a cotton stalk cutter which is of strong and durable construction, very easy to operate and not liable to get out of order.

The invention is illustrated in the accompanying drawings, wherein:

Fig. 1 is a top plan view of the machine in position for cutting cotton stalks.

Fig. 2 is a sectional view taken vertically along the line 2—2 of Fig. 1.

Fig. 3 is a sectional view taken on the line 3—3 of Fig. 2.

Fig. 4 is a side elevation showing the machine inverted to dispose the wheels in engagement with the ground and permit the machine to be easily transported from place to place.

The frame 1 of this cotton stalk cutter is formed of strong metal and has side bars 2 and front and rear bars 3 and 4. A draft bar 5, which is braced as shown at 6, extends forwardly from the frame and at its front end is a hitch 7 by means of which the machine is coupled to a tractor. Yokes 8 are carried by the side bars 2 for engagement by end portions of an axle 9 which extends transversely of the frame with its ends projecting therefrom and formed with arms 9' carrying offset spindles 10 upon which are mounted wheels 11 equipped with pneumatic tires 12. Straps 13 hold end portions of the axle in engagement with the yokes or struts 8 and, in order to brace the axle midway its length, there has been provided a bracing yoke 14 which is alined with the draw bar 5 and has its end portions welded or otherwise secured upon the front and rear bars of the frame, the rear end portion of the yoke being extended to form an ear or auxiliary hitch 15 with which another machine may be connected and towed after the stalk cutter. When the machine is in position for use as a cutter, the wheels are in an elevated position out of engagement with the ground but when the machine is inverted, the wheels rest upon the ground and the frame and mechanism carried thereby will then be elevated and disposed at such a height above the ground that the machine may be readily transported from one place to another. It should also be noted that the wheels are so located and of such diameter that they constitute means for engaging the ground and permitting turning of the frame from its position for use of the machine as a stalk cutter to the inverted position for transportation or from its inverted position to the position for use as a stalk cutter.

The cutting mechanism carried by the frame has end drums 16 having central portions of their heads externally thickened to form external bosses or hubs 17 through which extend stub axles 18. The stub axles are carried by disks 19 which are firmly secured against inner surfaces of heads of the drums by bolts 20 and the axles are of sufficient length to project outwardly and engage in the roller bearings 21 carried by the side bars 2 of the frame 1. The bearings are in the form of cups open at their inner ends to receive the sub axles and within the cups are rollers which surround the axles and cause the axles and drums to turn freely. Rods or bars 22 formed of steel or other strong metal, extend between the drums with their end portions extending into the drums and welded against the heads and annular flanges thereof. Midway the length of the rotary cutter, the rods 22 are surrounded by a reinforcing ring 23 and this ring and the drums 16 are provided with outstanding radially disposed ears or tongues 24 and 25 to which the cutting blades 26 are secured by rivets 27. In view of the fact that the blades 26 are secured midway their length as well as at their ends, they will be braced and prevented from being bowed inwardly and thus distorted or wrenched loose in case they should encounter rocks or the like during use of the machine.

When this machine is in use it is disposed as shown in Figs. 2 and 3 with the cutting mechanism in contact with the ground. A tractor is attached to the hitch at the front of the machine and, as the machine is drawn forwardly across a field the cutting mechanism will be turned in the bearings 21 by engagement of the blades with the ground. These blades will serve very effectively to cut cotton stalks encountered by them. After the stalk cutting operation is completed and it is desired to transport the machine to another field or to a place of storage, it is released from the tractor and tilted rearwardly to bring the wheels into contact with the ground. The tilting motion is then continued until the frame has been inverted and the machine rests upon the wheels, as shown in Fig. 4, instead of the cutting mechanism, and the tractor can then be again attached to the hitch and the machine towed back of the tractor. As the cutting mechanism will be in an elevated position, it will be out of engagement with the ground and will not interfere with movement of the machine when towed. It should also be noted that the cutting mechanism remains stationary during towing so that wear upon the bearings will be lessened.

Having thus described the invention, what is claimed is:

1. A cotton stalk cutting machine comprising a mobile frame having side bars and front and rear bars, bearings carried by said side bars, cutting mechanism having end drums formed with heads and marginal flanges, stub shafts extending through the heads of said drums and projecting outwardly therefrom with their projecting portions rotatably mounted in said bearings, disks at inner ends of said stub shafts secured against inner faces of the heads of the drums, bars extending between said drums and secured thereto, and cutting blades extending between said drums with their end portions mounted across the flanges thereof, said blades projecting radially from the drums for engagement with the ground during use of the machine.

2. A cotton stalk cutting machine comprising a mobile frame having side bars and front and rear bars, bearings carried by the side bars, cutting mechanism having end drums formed with heads and inwardly extending marginal flanges, stub shafts carried by the heads of said drums and projecting outwardly therefrom and engaged in said bearings to rotatably mount the drums, bars extending between said drums with their end portions extending into the drums and secured to the flanges thereof, a reinforcing ring surrounding said bars midway the length thereof and secured to the bars, ears extending radially from said ring and the flanges of said drums, and cutting blades extending between the drums with their end portions and their intermediate portions secured to said ears to mount the blades radially of the ring and the drums in position for engaging the ground during use of the machine.

JOHN L. RIGGS.